Oct. 27, 1959  J. R. RADCLIFFE  2,909,956
PLAYING INSTRUCTION DEVICE FOR PIANOS
Filed Feb. 25, 1958  2 Sheets-Sheet 1

INVENTOR:
JOHN R. RADCLIFFE
BY
Howson & Howson
ATTYS.

Oct. 27, 1959　　　　J. R. RADCLIFFE　　　　2,909,956
PLAYING INSTRUCTION DEVICE FOR PIANOS
Filed Feb. 25, 1958　　　　　　　　　　　　2 Sheets-Sheet 2
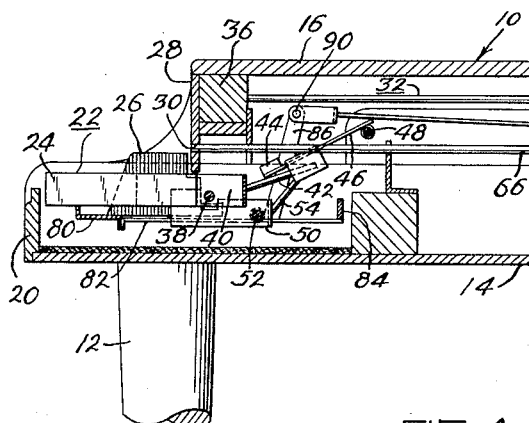
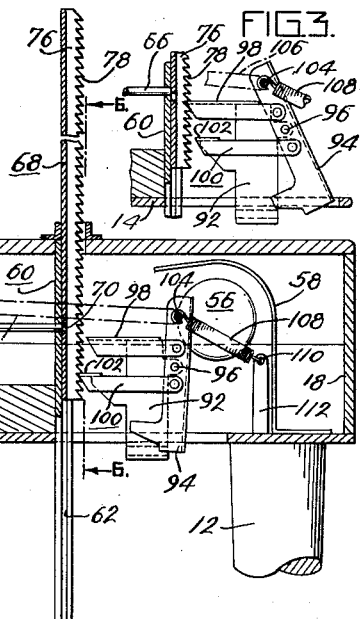
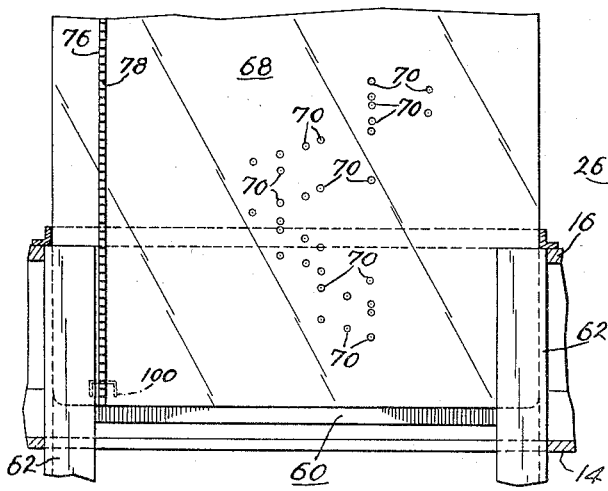
INVENTOR:
JOHN R. RADCLIFFE
BY
Howdon & Howdon
ATTYS.

2,909,956
PLAYING INSTRUCTION DEVICE FOR PIANOS

John R. Radcliffe, Philadelphia, Pa.

Application February 25, 1958, Serial No. 717,492

7 Claims. (Cl. 84—478)

The present invention relates broadly to improvements in means for teaching the playing of musical instruments, and more particularly is directed to an instruction device for pianos.

Heretofore, many devices have been designed for teaching the playing of pianos or the like, including indicating means which visually indicate the proper sequence of keys to be depressed to play a predetermined tune. Such devices however have, for the most part, been cumbersome and expensive and not susceptible of easy installation in pianos.

It is an object of the present invention to provide such an instruction device for pianos which is of extreme simplicity and which is susceptible of installation in existing piano constructions with a minimum of cost and rearrangement of the existing piano construction.

Another object of the invention is to provide such an instruction device for pianos utilizing visual indicating means to indicate, in proper sequence, the individual keys to be depressed to play a predetermined tune.

A still further object of the present invention is to provide a device including a card having a plurality of openings therein, arranged to indicate the proper sequence of keys to be depressed in playing a predetermined tune, and means for lowering the card in a step by step arrangement responsive to depression of the piano keys.

A still further object of the present invention is to provide an instruction device for pianos including an opening in the front of the piano above each key on the key board, and from which individual Lucite rods extend rearwardly and terminate in a spaced relationship with a single light source, and having interposed between their rear ends and the light source a card with a plurality of openings adapted for lowering movement, to expose the light source sequentially to individual Lucite rods, and therefore to an opening above an individual key to indicate that this key is to be depressed in keeping with the tune to be played.

Another object of the invention is to provide such an instruction device for pianos particularly suitable for use with play pianos for children due to its simplicity and low cost.

Other and further objects and advantages of the present invention will be more readily apparent from the following detailed description of an embodiment thereof when taken together with the accompanying drawings in which:

Fig. 2 is a sectional view taken on line 2—2 of Fig. 1;

Fig. 3 is a fragmentary view of operating mechanism for a card lowering device;

Fig. 4 is a fragmentary enlarged plan view of a portion of the indicating mechanism;

Fig. 5 is a fragmentary front elevational view of the key board and associated indicating means; and Fig. 6 is a fragmentary enlarged view taken on lines 6—6 of Fig. 2.

Figure 1:
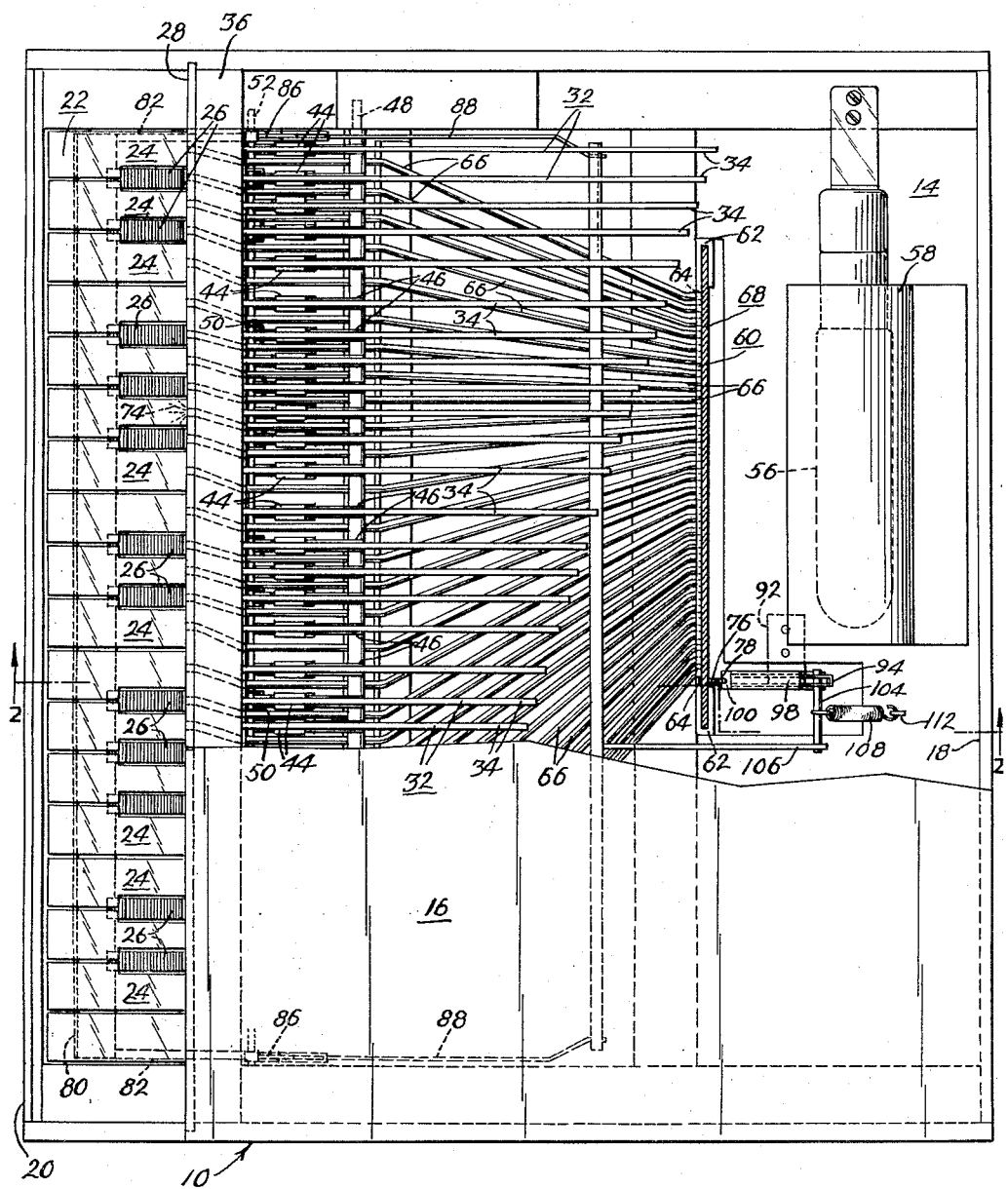
Fig. 1 is a top plan view, parts being broken away for clarity, of a piano incorporating my invention.

For purposes of illustration, the present invention is shown in the accompanying drawings as applied to a toy piano adapted for use by small children, although manifestly the principles are not restricted thereto and could be utilized with other pianos and other musical instruments as will be apparent to those skilled in the art.

The piano includes a body portion generally designated 10, mounted on legs 12 and including a base 14, a top 16, back 18, front 20 and key board 22. The key board includes a plurality of white keys 24 and a plurality of black keys 26 in the usual manner. A front panel 28 is arranged vertically over the keys toward the rearward portion thereof in the usual manner and in this front panel, above each key including whites and blacks, there is provided an opening 30 which extends through the panel 28 for purposes hereinafter to be described. The harp or mechanism for producing sound, generally designated 32, consists in a plurality of metal fingers of varying length 34 secured to a metal rod 36 extending transversely across the front portion of the piano as shown in Fig. 2.

The white keys 24 are pivoted at 38 and have secured thereto metal members 40 from which rods 42 extend and which are inclined upwardly. Metal U-shaped hammers 44 are secured on rods or wires 46 pivotally mounted at 48. When the white key 24 is depressed, the rod 42 is moved upwardly rapidly, which in turn throws hammer 44 against one of the metal fingers 34 to produce the proper tone or note.

The black keys 26 have metal members 50 secured to the rearward portion thereof, and are pivoted at 52. Angularly disposed rods 54 are secured to the metal members 50, and coact with similar mechanism utilized in connection with the white keys for playing the proper note upon depressing a black key.

The foregoing construction is similar to previously known constructions and the invention of the present application resides in means for indicating which of the keys should be depressed in their proper order in producing a given tune. This structure includes an incandescent bulb 56, such as a showcase bulb, disposed in the rear portion of the piano body and which is adapted for connection to a suitable source of electrical energy. A shield 58 is placed behind the bulb and directs the light from the bulb forwardly with respect to the piano.

A vertical plate 60 is mounted in the piano body and has the transverse ends thereof bent back upon the plate to form substantially U-shaped channels 62 at the transverse edges thereof. The front portion of this plate 60 has a plurality of horizontally spaced openings 64 therein corresponding in number to the number of keys on the key board. A plurality of Lucite rods 66 extend between the openings 30 in front panel 28, and openings 64 in vertical plate 60, and have their ends inserted in these openings. For each key on the key board there are a set of corresponding openings 30 and 64 between which a Lucite rod extends. As is well-known, one of the properties of Lucite is to transmit light therethrough, even though the Lucite rod is bent. Accordingly, when the lamp 56 is energized, in the absence of extraneous means in the nature of a shield interposed therebetween and the openings 64, light would be transmitted through each of the Lucite rods to the openings 30 above each of the keys, and would give a visual indication above the key by means of a dot of light.

In order to have this light indication above only a single one or a few of the keys at any given moment, indicating that these keys should be depressed, a record or note card 68 is utilized. This card can be constructed of any desired material and is provided with a plurality of perforations 70 extending therethrough. By reference to Fig. 6 it will be seen that these perforations are arranged so that only one perforation is on one transverse plane or line extending through the plate, and that on each succeeding line the perforations are transversely or laterally spaced and positioned with respect to one another. The positioning of these perforations corresponds with one of the rearward ends of the rods 66 inserted in one of the openings 64, and when this card is in the position shown in Fig. 2 light can only pass to one of the Lucite rods and accordingly, as shown in Fig. 4, this light is transmitted through this single Lucite rod as shown by dotted lines at 72, and gives a dot of light as shown at 74 above only a single key on the key board. As will be readily understood the other Lucite rods are not exposed to the light source due to the absence of perforations at their rear ends.

In order to play a tune, the card must be lowered in a step by step motion to bring sequentially, the next succeeding upper perforation on the card into line with one of the openings 64 to permit transmission of light through the designated Lucite rod to the key corresponding therewith. For this purpose, according to one embodiment of the invention, a rack plate 76 having teeth 78 thereon is secured to the back or rear side of the record card 68. A transversely extending Z-shaped member 80 extends under all of the keys of the key board and is secured to an arm 82 pivotally mounted at 52. The rearward end of arm 82 has a strip 84 secured thereto in the nature of a counter weight. A lever 86 extending upwardly at an angle is secured on the upper surface of arm 82 and at its upper end is pivotally connected to a rod 88 as at 90.

A bracket 92 is mounted on the piano body rearwardly of the vertical plate 60, and behind the card 68, as shown in Fig. 2 of the drawings. A vertical arm 94 is pivotally mounted at 96 on bracket 92 and carries two forwardly extending ratchet teeth 98 and 100 having horizontally disposed portions 102 at their forward ends which are slidably suspended on horizontal surfaces formed on bracket 92 as seen in Figs. 2 and 3 of the drawings. The leading edges of these ratchet teeth members 98 and 100 are adapted for alternate engagement with the teeth 78 on rack 76. A pin 104 is secured on vertical arm 94 in proximity to the top thereof, and an arm 106 interconnects rod 88 and pivot 104. A spring 108 has one end fastened to pin 104, and the opposite end secured to a hole 110 on upright 112. The purpose of the spring is to normally maintain the vertical arm 94 in a withdrawn position as shown in Fig. 2 of the drawings, in which position the ratchet tooth 100 engages in one of the teeth 78 on rack 76. Upon depressing any of the keys on the key board, the arm 82 is pivoted about pivot 52 which moves the arm 86 forwardly at its upper end, which draws rod 88 and arm 86 forwardly, to pivot vertical arm 94 about pivot 96 in opposition to the spring 108. When so doing this releases engagement between ratchet tooth 100 and the teeth 78 on rack 76, while at the same time, and almost instantaneously, engaging ratchet tooth 98 with another of the teeth 78 as shown in Fig. 3 of the drawings. This prevents the card 68 from sliding downwardly except by an incremental step by step movement. As the key is released the spring will return vertical arm 94 to its original restrained position, and reengage ratchet tooth 100.

In operation, as each key is depressed the card will be lowered step by step through the above described mechanism, and at each position of the card a different perforation 70 therein will expose light from bulb 56 to one of the Lucite rods 66 to transmit light to a single key above the key board through the openings 30, to thereby indicate the next key to be sequentially depressed in order to play a given tune.

While a single embodiment of the invention has been shown, manifestly many changes in minor details of construction such for example as providing a vertically mounted frame permanently associated with the piano into which cards can be interchangeably placed, and which frame would carry the rack and teeth could be used. Other minor details can be made without departing from the spirit and scope of the invention as defined in and limited solely by the appended claims.

It is to be understood that while Lucite, which is a registered trademark of E. I. du Pont de Nemours, has been solely mentioned, it is intended to include polymethyl methacrylates and other compounds which have the light transmitting power such as for example Plexiglas, a product produced by Rohm and Haas Company.

I claim:

1. In a piano having a keyboard and keys for actuating tone producing means, a panel above said keyboard, an opening above each said key through said panel, a light source in said piano, a vertically movable tune card having a plurality of perforations therethrough positioned between said light source and said panel and separate light transmitting rods extending from each said opening to said tune card adapted to transmit light from said source through at least one said perforation to at least one said opening above said keys.

2. In a piano as claimed in claim 1, the rearward ends of said rods being positioned in a horizontal plane, said perforations in said card being positioned in a plurality of vertically spaced transverse planes and means for lowering said card in a step by step movement to successively and sequentially align said perforations with at least one of said rearward ends of said rods.

3. In a piano as claimed in claim 2, said lowering means including a transversely positioned pivotally mounted bar extending beneath all said keys, a toothed rack associated with said tune card for vertical movement therewith and means engageable with the teeth of said rack operatively connected with said bar for incrementally lowering said card upon depression of any of said keys.

4. In a piano as claimed in claim 3, said means engageable with said teeth including two vertically spaced horizontally extending ratchet teeth members, a common support for said ratchet teeth pivotally mounted therebetween, means biasing said support to a position for engagement of one of said ratchet teeth with the teeth of said rack, and means interconnecting said bar and said common support for pivoting movement thereof for substantially simultaneously disengaging said one said ratchet tooth and engaging the other of said ratchet teeth to permit dropping of said card a distance equal to the distance between the teeth on said rack.

5. In a piano as claimed in claim 4, a vertical bracket mounted in close proximity to said common support, said common support being pivotally mounted on said bracket, horizontal guide surfaces on said bracket, and said ratchet teeth having horizontally disposed portions slidably engaged with said guide surfaces for maintaining alignment of said ratchet teeth.

6. In a piano having a plurality of keys operable for actuating sound producing means, a light source spaced from said keys, a plurality of light transmitting rods having one end of each thereof disposed in spaced relation to said light source and the opposite end of each thereof individually terminating at one said key, and light obturating means interposed between said light source and said one end of said rods, said obturating means having a plurality of vertically and transversely spaced perforations adapted upon vertical movement of said means to pass light from said source to one said rod for transmission therethrough to a said key.

7. In a piano as claimed in claim 1, said light transmitting rods being composed of Lucite.

References Cited in the file of this patent

UNITED STATES PATENTS

| | | |
|---|---|---|
| 2,647,749 | Wales | Aug. 4, 1953 |
| 2,675,731 | Ruben | Apr. 20, 1954 |
| 2,811,072 | Isaacson | Oct. 29, 1957 |
| 2,820,391 | Janssen et al. | Jan. 21, 1958 |

FOREIGN PATENTS

| | | |
|---|---|---|
| 249,928 | Germany | Aug. 1, 1912 |